Patented June 6, 1967

3,324,054
PRODUCTION OF POLYURETHANE FOAMS USING ARYLLEADTRIESTER CATALYSTS
Henricus G. J. Overmars, Zeist, Netherlands, assignor, by mesne assignments, to International Lead Zinc Research Organization, Inc., New York, N.Y., a corporation of New York
No Drawing. Filed Sept. 24, 1964, Ser. No. 399,064
Claims priority, application Netherlands, Oct. 7, 1963, 299,409
5 Claims. (Cl. 260—2.5)

The present invention relates to the production of polyurethane foams of the type in which a blowing agent is employed. More particularly, it relates to such foams in which the blowing agent is self-generated carbon dioxide gas, thus producing the closed cellular structure characteristic of such foams. Further, it relates to improved catalysts which promote both the formation of the polyurethane plastic (gelation), and the self-generation of carbon dioxide gas in the proper sequence during the process of foam formation.

In general, polyurethane foam is obtained by reacting polyfunctional isocyanates with polyhydroxy compounds in the presence of a blowing agent. This blowing agent can be a low-boiling liquid such as one of the Freons, lower hydrocarbons, esters and the like, so called physical blowing agents; and preferably it can be carbon dioxide, created by the reaction of water with a small part of the polyfunctional isocyanate, i.e., chemical or self-generating blowing agent.

Organometal compounds, e.g., tin dioctoate, are among the substances ordinarily used as catalysts for the reaction between isocyanates and polyhydroxy compounds, the so-called gelation catalysts. A drawback of such compounds as catalysts is that they are unstable, being readily hydrolized or oxidized, or both, thereby requiring the use of stabilizers, which in turn have drawbacks of their own. Basic metal compounds such as carbonates, carboxylates and the like, frequently give rise to a hydrolitic degradation of the final product. The well-known cobalt naphthenate gives rise to discolorations, and besides it requires the additional use of a hydrocarbon solvent, because by itself, it does not readily dissolve in the reaction mixture. It is true that strong bases are extremely active, but for the production of foam they are useless, because it is impossible to control the gelation. Ferric acetylacetonate is effective, but gives rise to discolorations and to an oxidative degradation of the final product.

According to the present invention, organolead compounds of the general formula:

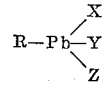

are used as catalysts.

In this formula R represents an aryl or alkylsubstituted aryl group, as for example, phenyl, naphthyl (alpha and beta), tolyl; X, Y and Z may each be chosen from the acid group: (a) alkyl carboxy radicals; (b) aryl carboxy radicals with the carboxyl group joined to the lead atom in both instances. X, Y and Z may thus be the same radical in any given compound, or they may each be a different radical.

Or my improved compounds may be considered to be the esters (or salts) of monoarylplumbonic acid, in some hydrated form, such as $RPb(OH)_3$, in which either all three of the hydroxy groups are combined with the above mentioned carboxy acids as above set forth, or esterification may be only partial so as to result, for example, in the compound:

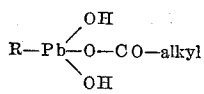

In such formula R will have the same meaning as above defined. The following are specific examples of suitable catalysts falling within the class of compounds broadly defined above:

Phenylleadtriacetate
Phenylleadtriisobutyrate
Phenylleadtrilaurate
Phenylleadtrioctoate
Phenylleadtribenzoate
Phenylleadtristearate
Beta-naphthyllead-triacetate
Beta-naphthylleadtribenzoate
Alpha-naphthylleadtripropylate
Paratolylleadtriacetate One salient advantage among others, of my improved compounds is the fact that they are soluble in the polyesters and polyethers commonly used as the polyhydroxy component in the preparation of polyurethane plastics.

The effectiveness of my improved compounds is well shown by the following tests in which said compounds are compared with catalysts that are in use, or already proposed for the purpose.

5 grams of a branched polyether, polyoxypropyleneglycol having a KOH index of 55 and molecular weight of about 3000, are mixed with 50 mg. of the substance to be tested. Subsequently, 0.4 cc. of toluenediisocyanate, 80% 2–4 derivative and 20% 2–6 derivative are admixed thoroughly; all of this at 20° C. The time is measured in minutes elapsing until the mixture has gelated. The results follow:

| Compound according to my invention | Gelating time in minutes |
|---|---|
| Phenylleadtriacetate | 9 |
| Phenylleadtriisobutyrate | 5 |
| Phenylleadtrilaurate | 30 |
| Phenylleadtrioctoate (2-ethyl-hexoate) | 35 |
| Para-tollylleadtriacetate | 12 |
| Beta-naphthylleadtriacetate | 6 |
| Beta-naphthylleadtribenzoate | 20 |
| Other compounds: | |
| Diphenylleaddilaurate | 600+ |
| Dibutylleaddilaurate | 450 |
| Diethylleadmaleinate | 600+ |
| Tributylleadlaurate | 450 |
| Triphenylleadacetate | 600+ |
| Tetraphenyllead | 600+ |
| Hexaphenyldilead | 600+ |
| Tin dioctoate | 4 |
| Dibutyl tin dilaurate | 32 |

A blank test in which no substance to be tested had been added, appeared to give a gelating time of over 600 minutes. It is to be observed that only gelating times up to 600 minutes have been measured. As a matter of fact, a gelating time of over 10 hours is impracticable. The above data make it quite clear that only one valency of the lead may be organically bound, if useful results are to be obtained. The tin compounds have been incorporated in the list for reasons to be stated hereinafter.

The use of other polyhydroxy compounds, other mixing ratios, or other isocyanates, has not been found to change the above conclusion. Furthermore, the above described testing method has been found to be applicable to the use of such other compounds.

The catalysts according to this invention are thus very suitable for obtaining a good polyurethane foam with the aid of the known physical blowing agents, i.e., other than self-generated $CO_2$.

Alternatively, the blowing agent for polyurethane foams may be self-generated $CO_2$ which results by the reaction of some of the isocyanate with water. In other words, two reactions occur during the foam formation and in the proper sequence, namely (1) gelation, and (2) $CO_2$ formation. It has been found that, when using this method, the catalysts according to this invention yield a most surprising technical effect.

Both reactions, i.e., the isocyanate-polyhydroxy reaction and the isocyanate-water reaction, require catalysis. Up till now, various catalysts have been used for these purposes, for example organometal compounds for the isocyanate-polyhydroxy reaction and tertiary amines for the isocyanate-water reaction. This procedure has its drawbacks, because the two catalyst systems can interfere with each other; therefore, in practice the possibilities are limited.

A great disadvantage of tertiary amines is that, as a result of their volatility, they lend an unpleasant smell to the final product. In addition, they give rise to undesired reactions in the final product which will bring about discolorations and a deterioration of the mechanical properties. They generally require high reaction temperatures and they are not very active; even to the point of being practically unfit for use in reactions with aliphatic isocyanates. For these reasons, and also with a view to simplicity, there is a need for a single catalyst which will catalyze both these reactions; such a catalyst, however, should not only bring about a satisfactory isocyanate-polyhydroxy reaction, but also a satisfactory isocyanate-water reaction, and in addition it should bring these about in such a way as to have each of these reactions catalyzed at the right time and in the right manner. A catalyst which would strongly catalyze the $CO_2$ formation before the formation of polyurethane was well on its way, is no more satisfactory than a catalyst which would have substantially completed the polyurethane formation before the formation of $CO_2$ gets started. Moreover, certain determined requirements are looked for in the final product, such as a fine and regular structure of the foam, while it is desirable that the foam should possess a certain flexibility. It is also desirable that the catalyst should properly dissolve in the polyhydroxy compounds, such as polyethers and polyesters. Finally, there should intervene a certain lapse of time between the mixing of the components and the initiation of foaming, such in connection with the manageability and particularly for the benefit of processing with the aid of the usual spray nozzles.

A known catalyst, i.e., tin dioctoate, for instance, is found to be much too slow in catalyzing the $CO_2$ formation, whereas, for instance, another known catalyst, i.e., triethylene-diamine is found to be much too slow in catalyzing the gelating reaction, i.e., the polyurethane formation. Neither is it possible to render these catalysts suitable for the twofold purpose by changing the concentrations applied. It is indeed possible to slow down the formation of $CO_2$ with triethylene diamine, by using a lesser concentration of catalyst, but this is of no avail because in that case gelation is even more retarded. If the concentration of tin dioctoate is increased, the formation of $CO_2$ is indeed accelerated, but so is the gelation to a much higher degree.

The catalysts according to the invention are now found to catalyze the formation of $CO_2$ exactly at the right time. The use of my catalysts by themselves will, therefore, suffice for the carrying out of both reactions thus avoiding the disadvantages of the existing systems involving plural catalysts.

The following testing method for the formation of $CO_2$ was used:

80 mg. of the substance to be tested is mixed with 4 cc. of tetrahydrofuran and 4 cc. of dimethylcellosolve in which 228 mg. of water has been dissolved in a flask filled with carbon dioxide gas. The flask is connected to a gas burette and 2 cc. of toluene-diisocyanate (80% 2-4 and 20% 2-6-derivative) is added while stirring; all of this at 30° C. The time in seconds necessary for the formation of 100 cc. of $CO_2$ is measured, whereby the following figures were obtained.

| Compound: | Time in seconds for 100 cc. $CO_2$ |
|---|---|
| Phenylleadtriacetate | 15 |
| Phenylleadtriisobutyrate | 17 |
| Phenylleadtrilaurate | 25 |
| Phenylleadtrioctoate | 37 |
| Phenylleadtristearate | 43 |
| Phenylleadtribenzoate | 22 |
| p-Tolylleadtriacetate | 17 |
| Beta-naphthylleadtriacetate | 17 |
| Beta-naphthylleadtribenzoate | 32 |
| Diphenylleaddilaurate | 550 |
| Tributylleadacetate | 170 |
| Tetrabutyllead | 600 |
| Triethylenediamine | 6.5 |
| Triethylamine | 30 |
| Tin dioctoate | 400 |

A blank test yielded less than 100 cc. of $CO_2$ after 600 seconds.

In this test also the compounds according to the invention are found to give more satisfaction than the known compounds for this purpose. The catalysts according to the invention are found to be sufficiently effective even at concentrations lower than, for instance, 1% calculated on the weight of the reaction components; this is in contrast to many known catalysts, which rapidly become ineffective at a decrease of concentration. The amount of catalyst to be used in order to obtain a good foam can easily be established by a practical test. Such amount will depend on both the procedure and the apparatus used to produce the foam. Quantities on the order of from 0.05 to 5 percent by weight are recommended. Higher concentrations can be advantageous if a very rapid foam formation is possible and/or desirable, and lower concentrations also yield good foams, although at a somewhat slower rate.

The foams obtained with a catalyst according to the invention are of a fine and regular foam structure and have good mechanical properties. Formation of rigid or flexible foams may be controlled by the choice of reaction components.

Besides toluenediisocyanate there are other aliphatic or aromatic isocyanates which are highly suitable for use in the present process, such as polymethylenepolyphenylisocyanate, diphenylmethanediisocyanate and the like, as are mixtures of known isocyanates. The same holds good for polyhydroxy compounds.

In the formation of foam, it is possible to use still other known substances, such as stabilizers, substances which reduce the combustibility and/or the inflammability, filling agents, pigments, dyes, silicone oil, other catalysts and the like. All the physical conditions known in the conventional formation of polyurethane, such as temperature and concentration of the reactants can be adapted in this case also to the required operational techniques and/or the desired properties of the foam.

The time elapsing between the mixing of the components and the foaming up of the mass is easily controlled by the choice of reaction circumstances. Under otherwise equal circumstances as regards the concentrations of components and catalysts, and as regards temperature, the catalysts according to the invention usually allow of a somewhat ampler time than the known catalysts, which means, for example, that the risk of a premature gelation and/or foaming-up in the spray nozzle itself, i.e., before spraying takes place, is very slight.

The apparent specific weight in kilograms per cubic meter of foam can be controlled within wide limits by a suitable choice of the concentrations, inter alia of water. It is very simple to attain apparent specific weights between 0.01 or lower and 0.06 and higher.

In the following examples the percentages are by weight, calculated on the weight of polyether.

Example I 100 grams of a linear poly(oxypropylene) glycol (KOH-number 55.2 and molecular weight 3000) were mixed with 1% of silicone oil and 0.2% of phenyllead-triacetate, while stirring vigorously. After some time, 4 grams of water was added and subsequently 44 grams of 80/20 toluenediisocyanate at a quick rate.

After 10 more seconds of stirring the mixture was poured out into a paper cylinder, in which, after some 40 seconds, a very rapid foaming took place. All of this took place at room temperature. After further heating at about 80° C. a foam was obtained having an extremely regular foam structure and an apparent specific weight of 0.028. The swelling in benzene amounted to 30% and that in acetone to 20%.

Example II 100 grams of a poly(oxypropylene) triol (molecular weight 2000) were mixed with 1% of silicone oil and 0.2% of phenylleadtriacetate, while stirring vigorously. After some time 4 grams of water was added and subsequently at a rapid rate 44 grams of a mixture of 2.4–2.6-toluenediisocyanate in a ratio of 80:20. After another 10 seconds of stirring the mixture was poured into a paper cylinder, in which a very rapid foaming-up occurred after about 40 seconds. All of this was at room temperature. A polyurethane foam was produced having a regular foam structure and an apparent specific weight of 0.027.

The swelling in benzene amounted to 33%; that in acetone 25%.

Example III

Example II was repeated, but this time with 0.2% of beta-naphthylleadtriacetate, 3 grams of water and 35 grams of toluenediisocyanate. The apparent specific weight of the foam was 0.036.

Example IV

Example II was repeated, but with 0.3% of phenyl-leadtriisobutyrate, 3 grams of water and 34 grams of toluenediisocyanate. The apparent specific weight of the foam was 0.030.

Example V

Example II was repeated, but this time with 0.6% of phenylleadtrilaurate, 3 grams of water and 34 grams of toluenediisocyanate. The apparent specific weight of the foam was 0.034.

The formation of foam can take place in a mold, for instance, with the aid of known foaming machines. The foam can also be brought into a desired shape by sawing, milling and the like. It is also possible to have the foam form on a carrier or between two plates or foils, as for instance, paper and the like, thus obtaining laminates. Such shaped foam products are also considered to come within the scope of my invention.

No claim is made herein to the organolead compounds per se, all of which are described in the literature, as for example, the recently published compendium and bibliography entitled "Organolead Chemistry," by L. C. Willemsens, February 1964, published in Holland by International Lead Zinc Research Organization of New York, N.Y.

It will be understood that many other organolead compounds will occur to those skilled in the art which are either within the scope of the appended claims, or are the full equivalent of the compounds specifically disclosed, and that these compounds are within the spirit of my invention.

I claim:

1. In the process of making polyurethane foamed products by reacting organic polyfunctional isocyanates and polyhydroxy compounds, the step comprising adding a catalytic amount of a catalyst having the formula:

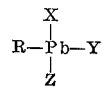

wherein:

R is selected from the group consisting of (a) aryl and (b) alkyl substituted aryl radicals; and X, Y, and Z are selected from the group consisting of (a) alkyl carboxy and (b) aryl carboxy radicals, wherein said carboxy groups are joined to the lead atom.

2. The process of claim 1 wherein R is selected from the group consisting of phenyl, naphthyl, and tolyl.

3. The process of claim 1 wherein X, Y, and Z are selected from the group consisting of acetate, propylate, butyrate, isobutyrate, laurate, stearate, benzoate, and 2-ethylhexoate.

4. The process of claim 1 wherein X, Y, and Z are the same radical.

5. A process according to claim 1 wherein water is included in the reaction mixture to react with a portion of said isocyanate to give $CO_2$ to function as a blowing agent.

References Cited

UNITED STATES PATENTS

| | | | |
|---|---|---|---|
| 3,123,577 | 3/1964 | Heiss | 260—2.3 |
| 3,136,731 | 6/1964 | Piechota et al. | 260—2.5 |
| 3,179,627 | 4/1965 | Twitchett | 260—77.5 |
| 3,194,770 | 7/1965 | Hostettler | 252—431 |
| 3,201,358 | 8/1965 | Hostettler et al. | 260—2.5 |
| 3,201,359 | 8/1965 | Herrick et al. | 260—2.5 |

FOREIGN PATENTS

| | | |
|---|---|---|
| 901,056 | 7/1962 | Great Britain. |
| 1,009,965 | 11/1965 | Great Britain. |
| 1,033,928 | 6/1966 | Great Britain. |
| 1,160,171 | 12/1963 | Germany. |
| 1,361,357 | 4/1964 | France. |

OTHER REFERENCES

I & EC Product Research & Development, vol. 1, December 1962, pp. 261–264 of interest.

DONALD E. CZAJA, *Primary Examiner.*

LEON J. BERCOVITZ, *Examiner.*

F. McKELVEY, *Assistant Examiner.*